United States Patent

Takeda

[11] Patent Number: 5,769,307
[45] Date of Patent: Jun. 23, 1998

[54] IRON-TYPE GOLF CLUB HEAD AND PRODUCTION METHOD THEREFOR

[75] Inventor: Hitoshi Takeda, Tsubame, Japan

[73] Assignee: Kabushiki Kaisha Endo Seisakusho, Niigata-ken, Japan

[21] Appl. No.: 668,092

[22] Filed: Jun. 19, 1996

[30] Foreign Application Priority Data

Aug. 21, 1995 [JP] Japan .................................... 7-212067
Mar. 12, 1996 [JP] Japan .................................... 8-054915

[51] Int. Cl.[6] .............................................. B23K 20/12
[52] U.S. Cl. .................................... 228/114.5; 228/112.1; 473/305; 473/349
[58] Field of Search ........................... 228/114.5, 112.1; 473/305, 349

[56] References Cited

U.S. PATENT DOCUMENTS 4,892,316  1/1990  Langert et al. ...................... 473/305
5,480,152  1/1996  Schmidt et al. ...................... 473/349
5,505,795  4/1996  Tsai et al. ........................... 473/305

FOREIGN PATENT DOCUMENTS 7-144029  6/1995  Japan .

OTHER PUBLICATIONS

E.D. Nicholas, "Where Industry Uses Friction Welding," *Welding Design & Fabrication*, Aug. 1977, pp. 74–76.

Primary Examiner—P. Austin Bradley
Assistant Examiner—Jeffrey T. Knapp
Attorney, Agent, or Firm—Quarles & Brady

[57] ABSTRACT

An iron-type golf club head 1 can elongate a travelling distance of balls for a long iron and can enable the better controlling of balls for a short iron. A head body 8, having a face 3, is formed from one material, while a hosel 7 formed from another material having the different specific gravity than that of the head body 8. For long irons, the material of the hosel 7 is denser than that of the head body 8, while for short irons, the material of the head body 8 is denser than that of the hosel 7. A friction welding process may be used to join the head body 8 to the hosel 7.

6 Claims, 16 Drawing Sheets

F I G. 10
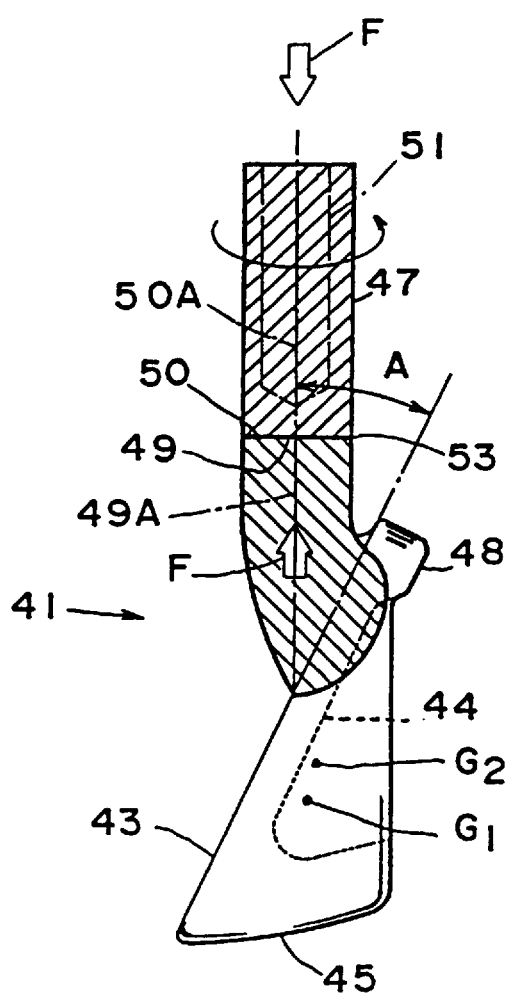

IRON-TYPE GOLF CLUB HEAD AND PRODUCTION METHOD THEREFOR

BACKGROUND OF THE INVENTION (a) Field of the Invention

The present invention relates to an iron-type golf club and a production method therefor.

(b) Description of Prior Art

Generally, a golf club is comprised of a head and a shaft, classified into three types, i.e., wood, iron and putter.

Iron golf club is further classified according to an angle of loft (loft angle). Iron golf club having a smaller loft angle (e.g., 20 to 30 degrees), is designated long iron, while iron golf club head having a larger loft angle (e.g., 40 to 50 degrees) designated short iron. In general, iron golf club is numbered, beginning at short iron toward long iron, such as 1st, 2nd, 3rd, 4th, 5th, 6th, 7th, 8th, 9th, PW (pitching wedge), SW (sand wedge) and LW (lob wedge) or the like.

Conventionally, there are two types of iron golf club heads in terms of its structure, one is so-called cavity-back iron, having a face for striking balls and a back, the other so-called solid-back iron, having a smoothed back. Such golf club heads have one of the most important attributes thereof or so-called a sweet spot in a certain area on the face.

In the past, there has been proposed an iron golf club head, in FIG. 1 of Japanese Patent Appln Laid-Open No. 7-144029, wherein the weight in the outer periphery of the head is adjusted so that the center of gravity of the head may be consistent with the geometrical center on the face or the position at which balls are expected to be struck.

Whereas, for an iron golf club head, contradictory performances are required, i.e., allowing balls to travel a longer distance and at the same time permitting of the better-controlling of the travelling thereof. Long iron is for such longer-distance travelling, while short iron for better control of balls. According to the prior iron golf club head, there has been proposed the change of the configuration of the cavity, which, however, would set limit to satisfy the desired performances.

SUMMARY OF THE INVENTION

To eliminate the above-mentioned problems, it is, therefore, a main object of the present invention to provide an iron-type golf club head of which long iron enables noticeably elongating of the travelling distance of balls, while short iron permits the better control of balls.

It is another object of the present invention to provide a production method for such iron-type golf club head.

According to a major feature of the present invention, there is provided an iron-type golf club head having a face at its front and a hosel at its one side for mounting a shaft thereto, which comprises a head body having said face, said head body being formed from a material having a specific gravity different than that of a material for said hosel.

BRIEF DESCRIPTION OF THE DRAWINGS

Other objects, features and advantages of the invention will be apparent to those skilled in the art from the following description of the preferred embodiments of the invention, wherein reference is made to the accompanying drawings, of which:

FIG. 10 is a section showing a fourth embodiment of the invention, illustrating a golf club head in a joined state.

DETAILED DESCRIPTION OF THE PREFERRED EMBODIMENTS

Figure 1:
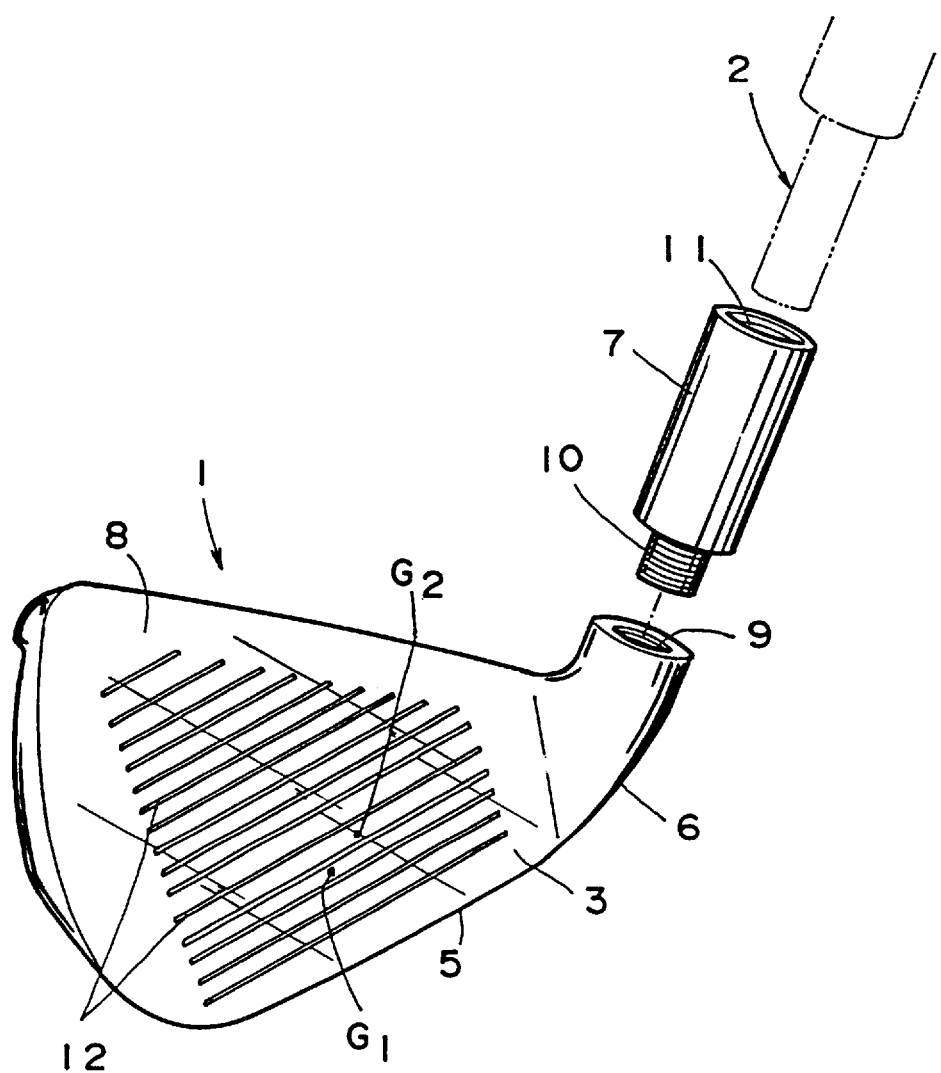
FIG. 1 is an exploded perspective view showing a first embodiment of the invention.
Figure 2:
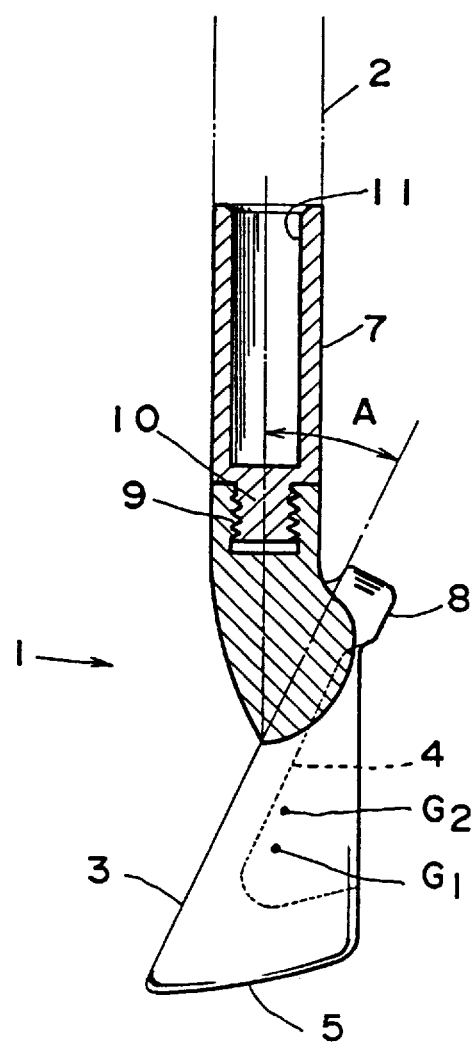
FIG. 2 is a section showing a first embodiment of the invention.
Figure 3:
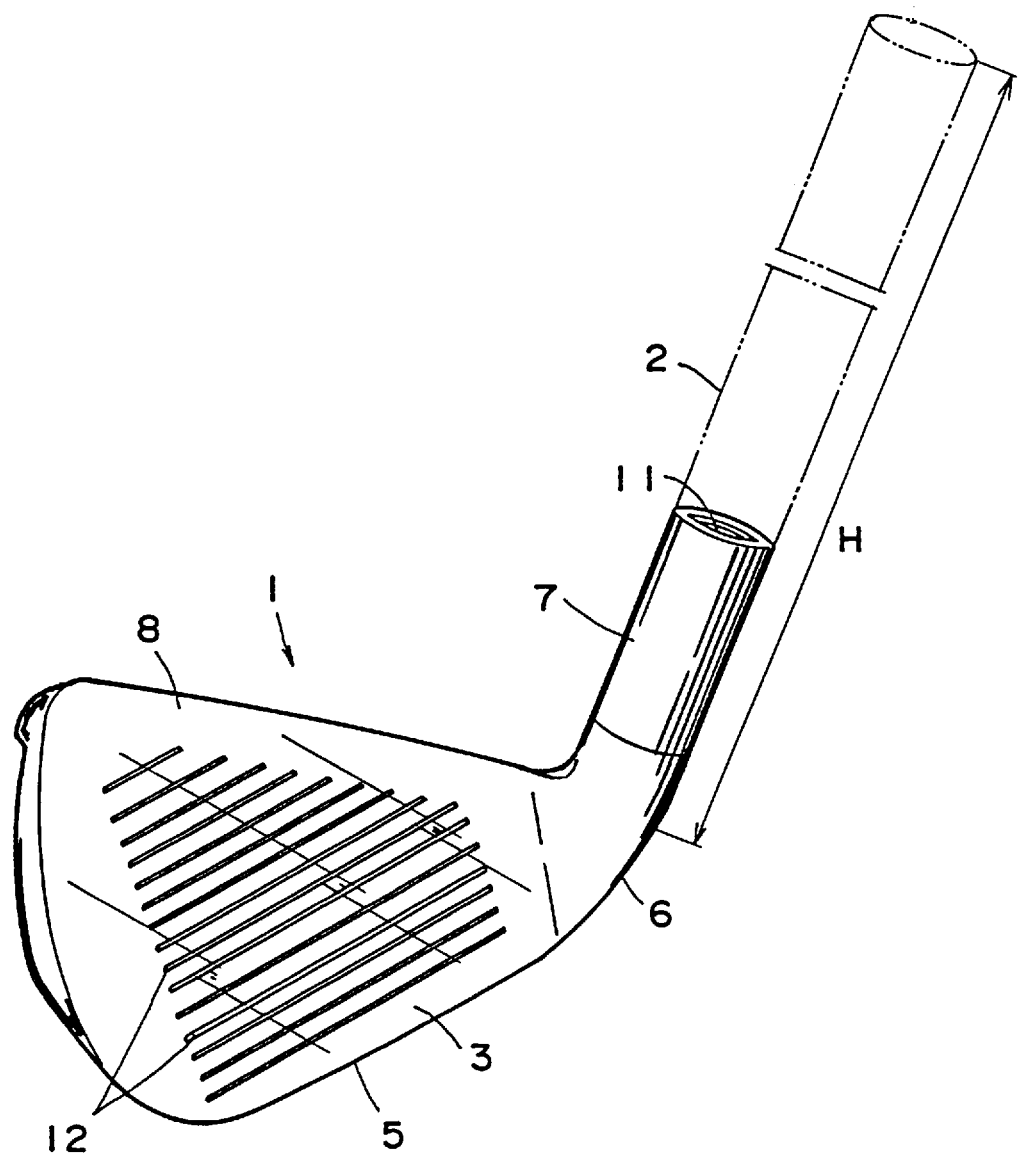
FIG. 3 is a perspective view showing a first embodiment of the invention.
Figure 4:
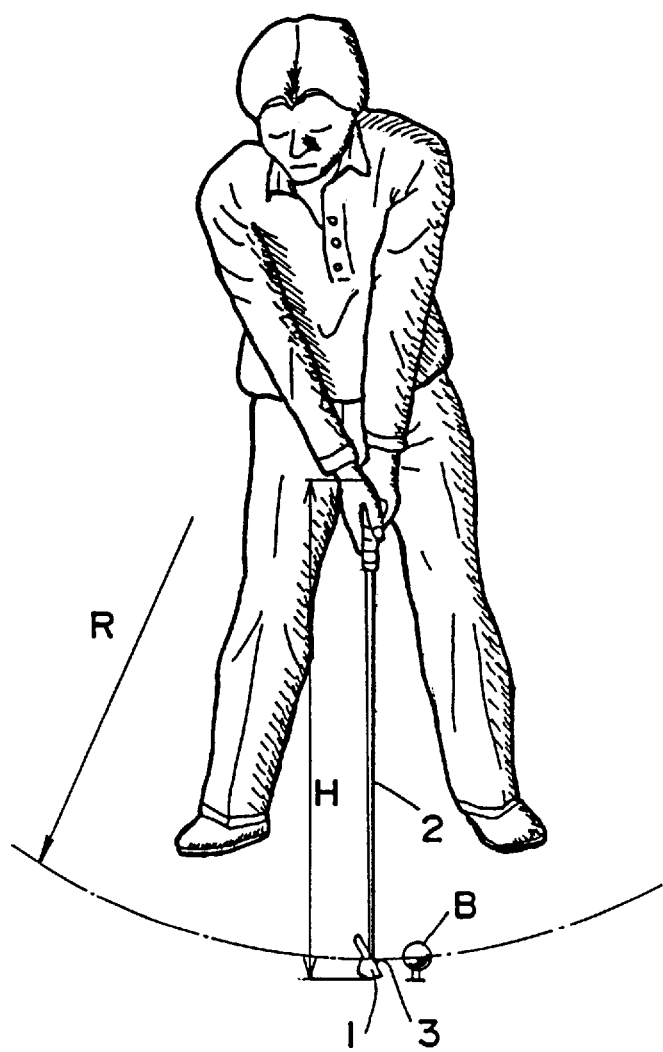
FIG. 4 is an explanatory front view illustrating a player's swinging stance in the case of a first embodiment.
Figure 5:
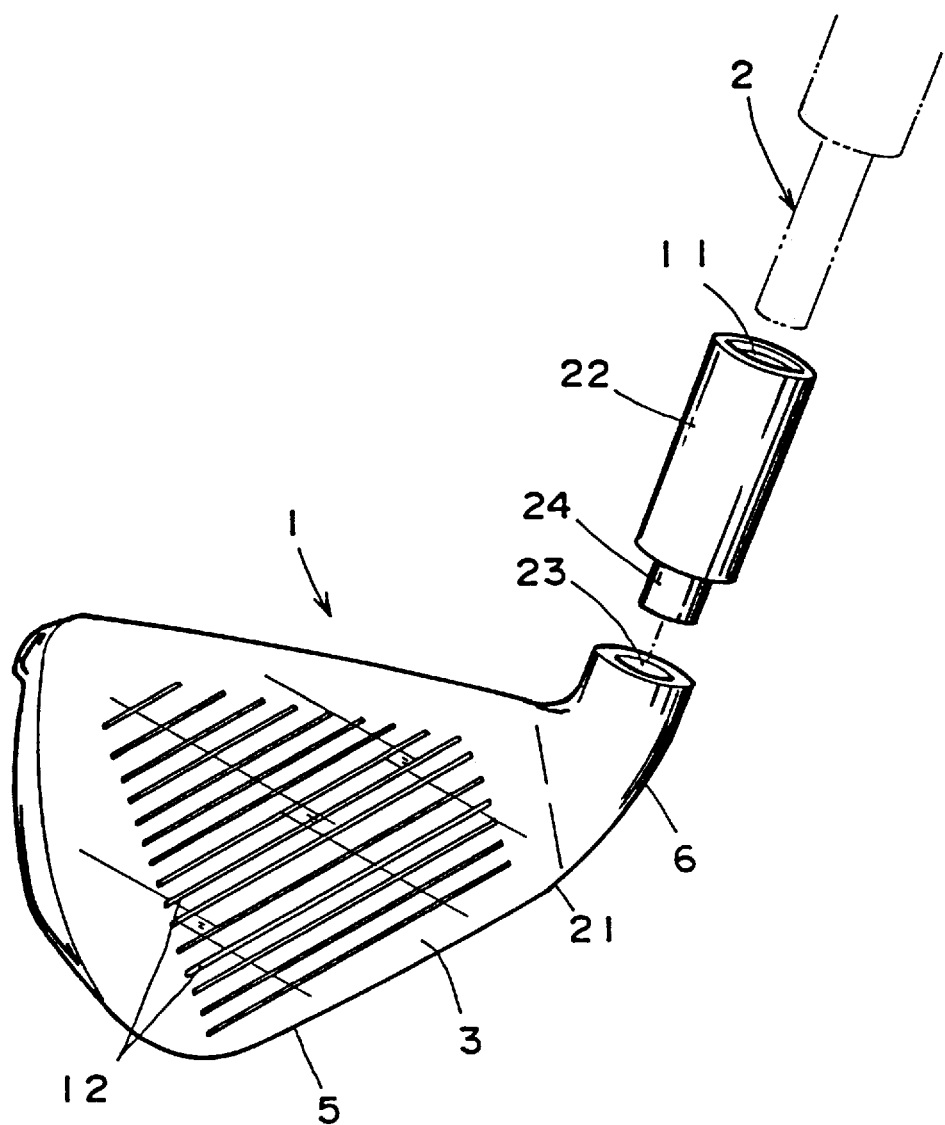
FIG. 5 is an exploded perspective view showing a second embodiment of the invention.
Figure 6:
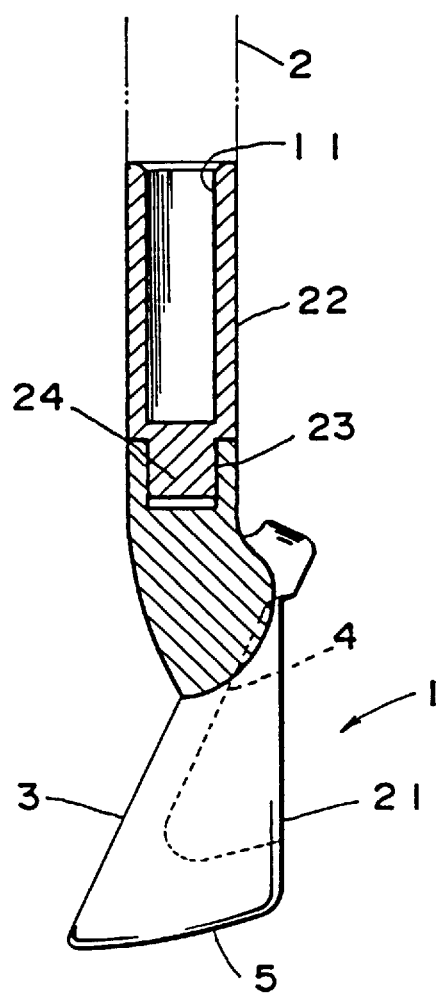
FIG. 6 is a section showing a second embodiment of the invention.

Hereinafter is described a first embodiment of a golf club head of the invention with reference to FIGS. 1 to 4.

An iron golf club head comprises a head 1 and a shaft 2. The head 1 has a face at its front, a recess 4 called a cavity at its back, a sole 5 at its bottom, a heel 6 at its one side of the bottom and a hosel 7 for attaching shaft 2 thereto at the same side thereof. The head 1 comprises a head body 8 formed with said face 3, recess 4, sole 5 and heel 6, and the short-cylinder-shaped hosel 7, which being formed of material of different specific gravities by forging in advance, and the head body 8 and the hosel 7 being integrally combined.

An upper part of the one side of the head body 8 is formed with a female threaded hole 9, into which is screwed a male screw 10 formed at a lower part of the hosel 7, while into a mounting hole 11 formed at an upper part of the hosel 7 is inserted the shaft 2, thus assembling an iron-type golf club head.

The head 1 has the following dimensions of a loft angle A and a length of a club, corresponding to the iron number.

TABLE 1

| IRON NUMBER | LOFT ANGLE (degree) | LENGTH OF CLUB (inch) |
|---|---|---|
| 1 | 14–17, preferably 15 | 39.5–40, preferably 39.5 |
| 2 | 17–20, preferably 18 | 39–39.5, preferably 39 |
| 3 | 20–23, preferably 21 | 38.5–39, preferably 38.5 |
| 4 | 23–26, preferably 24 | 38–38.5, preferably 38 |
| 5 | 26–30, preferably 28 | 37.5–38, preferably 37.5 |
| 6 | 30–34, preferably 32 | 37–37.5, preferably 37 |
| 7 | 34–38, preferably 36 | 36.5–37, preferably 36.5 |
| 8 | 38–42, preferably 40 | 36–36.5, preferably 36 |

TABLE 1-continued

| IRON NUMBER | LOFT ANGLE (degree) | LENGTH OF CLUB (inch) |
|---|---|---|
| 9 | 42–46, preferably 44 | 35.5–36, preferably 35.5 |
| PW | 46–50, preferably 48 | 35–35.5, preferably 35 |
| W | 50–54, preferably 52 | 35–35.5, preferably 35 |
| SW | 54–58, preferably 56 | 34.5–35.5, preferably 34.5 |
| LW | 58–62, preferably 60 | 34.5–35.5, preferably 34.5 |

For the long irons of the 1st to 5th irons in the above Table 1, steel (the specific gravity:approx. 7.9) is chosen as the material for the head body 8, while titanium or titanium alloy (the specific gravity:approx. 4.5) for that for the hosel 7. Thus the specific gravity of the material for the hosel 7 is smaller than that for the head body 8.

On the other hand, for the short irons of the 6th to 9th irons W, SW and LW in the above Table 1, steel (the specific gravity:approx. 7.9) is chosen as the material for the head body 8, beryllium copper alloy (the specific gravity:approx. 8.2) for the hosel 7. Thus, the specific gravity of the material for the hosel 7 is larger than that for the head body 8. Incidentally, reference numeral 12 designates so-called score lines formed on the face 3.

Next, the action of the above-structured golf club head will be described.

For long irons, as the hosel 7 is formed of the material thinner than that for the head body 8, the center of gravity $G_1$ of the head 1 can be located at the opposite side to the heel 7, and relatively downward, as contrasted to the conventional long irons each having the head body integrally combined with the hosel, both being formed of steel. Accordingly, the orbital radius R in swinging can be enlarged, thereby increasing moment of inertia. As a result, larger striking impact can be imparted to balls B so as to make them travel a longer distance.

For short irons, as the hosel 7 is formed of the material denser than that for the head body 8, the center of gravity $G_2$ of the head 1 can be located at the side proximate to the heel 7, and relatively upward, as contrasted to the conventional long irons each having the head body integrally combined with the hosel, both being formed of steel. Accordingly, the orbital radius R in swinging can be shortened, thereby decreasing moment of inertia. As a result, the weight proximate to a player's hand can be relatively increased so as to permit the better control of the balls B in striking them.

According to a first embodiment of the invention, as the head body 8 having face 3 is formed of the material of the different specific gravity than that of the material for the hosel 7, the positions of the centers of gravity $G_1$ and $G_2$ can be adjusted so as to change the moments of inertia with respect to the rotational center approximated to the position of player's shoulder, thereby permitting the exhibiting of the performances, such as either elongating the travelling distance of balls or better controlling of the balls B, corresponding to each iron number.

More specifically, for long irons, the material for the hosel 7 is thinner than that for the head body 8, wherey the travelling distance of balls can be elongated. On the other hand, for short irons, the material for the hosel 7 is denser than that for the head body 8, whereby the balls B are allowed tobe better controlled. Thus, there can be provided a set of iron golf club heads that can exhibit the apparently contradictory performances.

In FIGS. 5 to 8 showing second and third embodiments of the invention, the same portions as those described in a first embodiment will be designated as common reference numerals, and their repeated detailed descriptions will be omitted.

In a second embodiment, a head body 21 is connected with a hosel 22 by fitting or bonding the former to the latter. In this case also, for long irons, the material for the hosel 22 is thinner than that for the head body 21, while for short irons, the material for the hosel 22 is denser than that for the head body 21. An upper part of one side of the head body 21 is formed with a mouting hole 23, into which is inserted a protrusion 24 formed at a lower part of the hosel 22, which is fixed to the mounting hole 23 with an adhesive (not shown), or may be pressed thereinto.

According to a second embodiment of the invention, suitable positions of the C. G. of the head 1 can be set, corresponding to short irons or long irons, in the same manner as a first embodiment. Further, as the head body 21 is connected to the hosel 22 by means of bonding or press-fitting, simplified connection therebetween can be realized.

Figure 7:
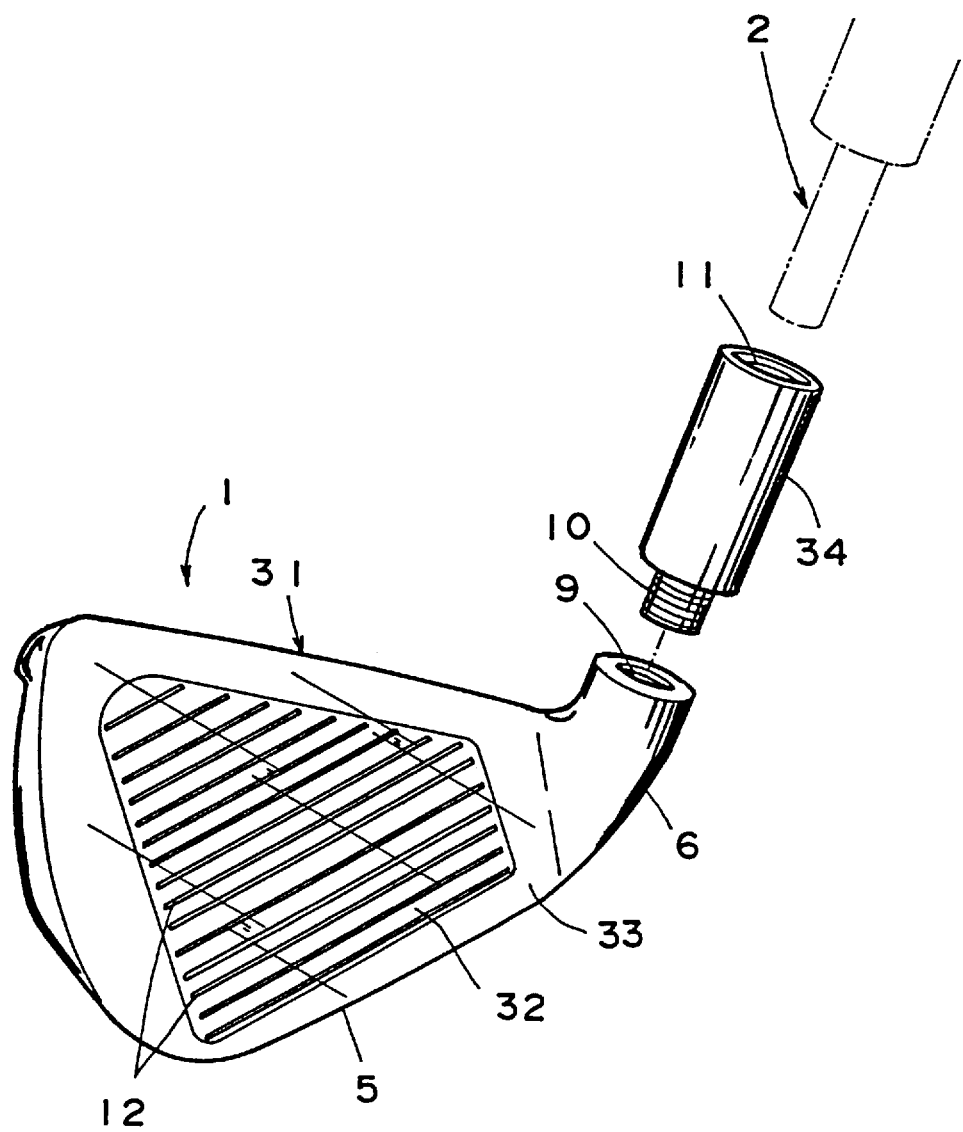
FIG. 7 is an exploded prspective view showing a third embodiment of the invention.
Figure 8:
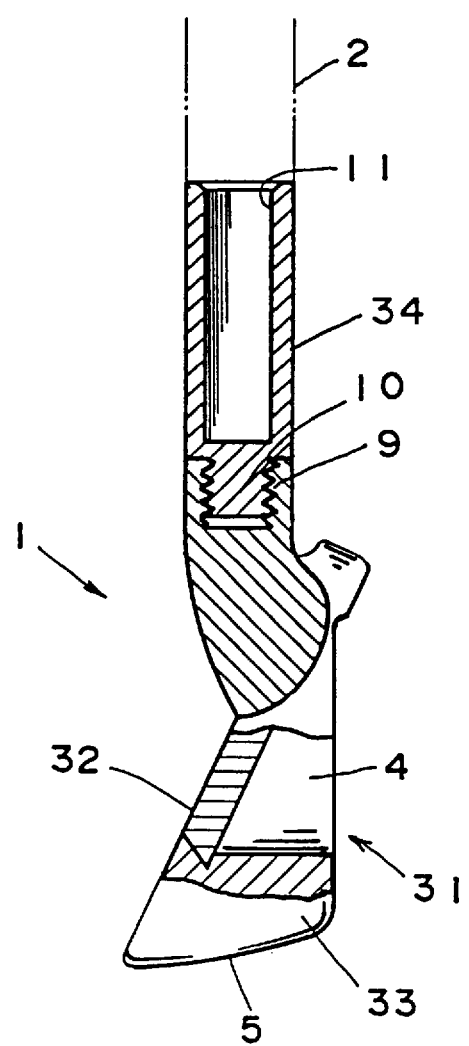
FIG. 8 is a section showing a third embodiment of the invention.

Referring to FIGS. 7 and 8 showing a third embodiment, a head body 31 comprises a face member 32 and a frame member 33 integrally provided along an outer periphery of the face member 32. The face member 32 is made of titanium or titanium alloy, while the frame member made of a material denser than that of the face member 32, such as beryllium copper alloy or steel. A hosel 34, which is connected to the head body 31 by screwing, bonding or press-fitting, is made of a material having the specific gravity different than that of the head body 31, i.e., the weight of the head body 31 divided by the volume thereof. In this case also, for long irons, the material for the hosel 34 is thinner than that for the head body 31, while for short irons, the material for the hosel 34 is denser than that for the head body 31.

According to a third embodiment of the invention, suitable positions of the C. G. of the head 1 can be set, corresponding to short irons or long irons, in the same manner as a first embodiment. Further, as the head body 31 comprises the face member 32 and the frame member 33 denser than the face member 32, the weight of the face member 32 can be distributed toward the periphery of the face member 32, thus enlarging a sweet area.

Figure 9:
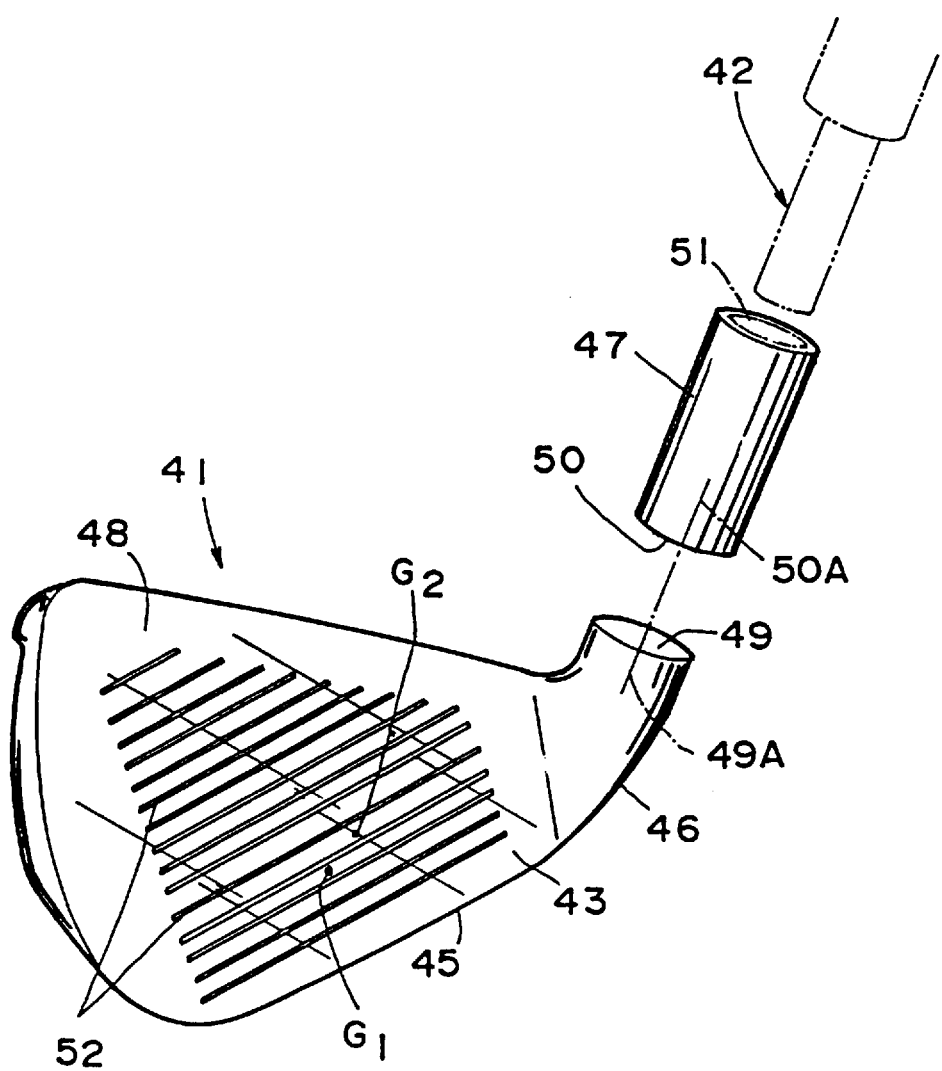
FIG. 9 is an exploded perspective view showing a fourth embodiment of the invention.
Figure 11:
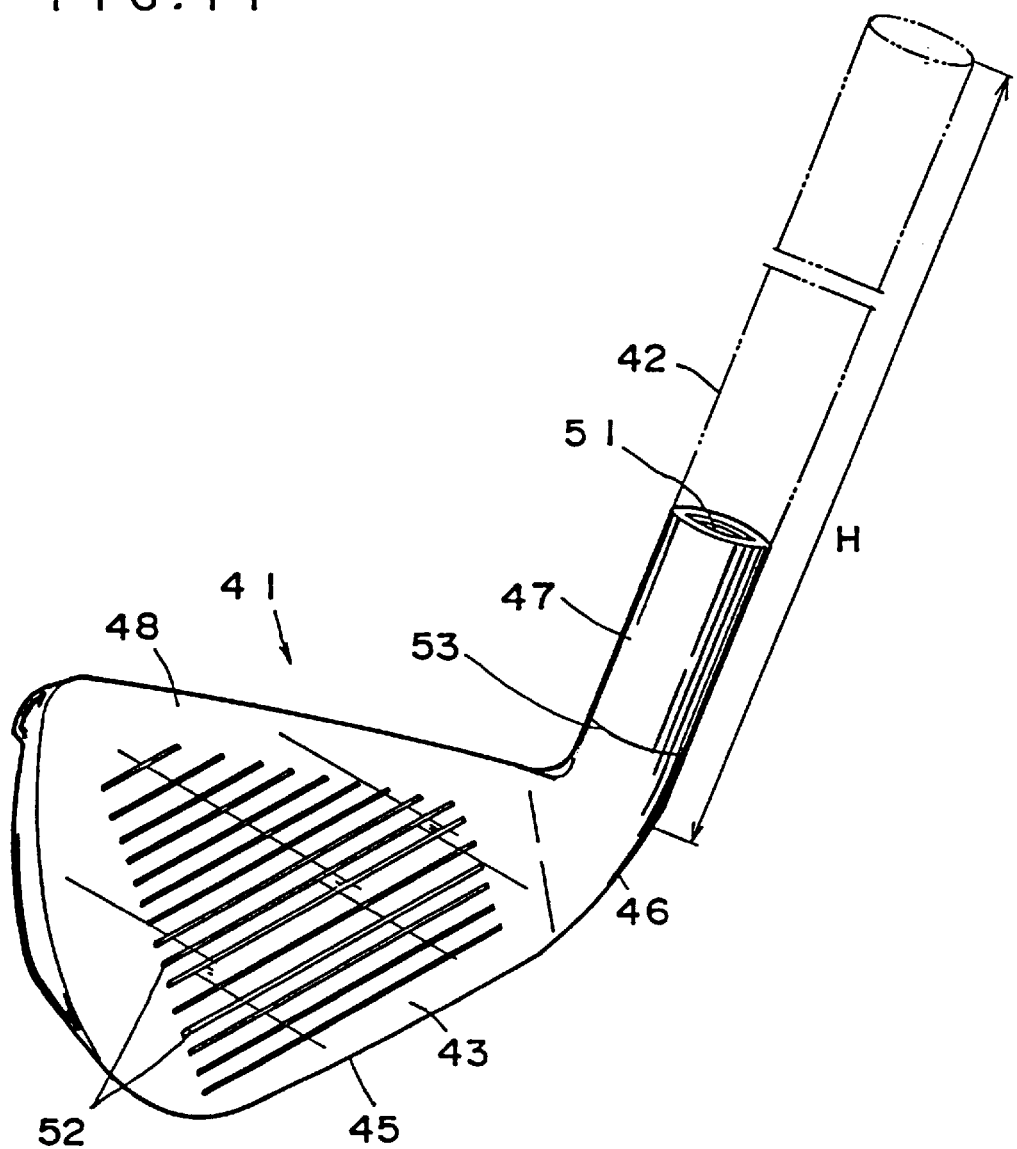
FIG. 11 is a perspective view showing a fourth embodiment of the invention.

Next, a fourth embodiment of the invention will be explained with reference to FIGS. 9 to 11. An iron-type golf club head of this embodiment comprises a head 41 and a shaft 42. The head 41 is formed with a face 43 at its front suface, a recess 44 customarilly called "cavity" at its back surface, a sole 45 at its lower portion, a heel 46 at a lower portion of one side thereof and a hosel 47 for connecting the shaft thereto at an upper portion of the same side thereof, respectively.

The head 41 comprises a head body 48 formed with aforesaid face 43, recess 44, sole 45 and heel 46, and the short-cylinder-like hosel 47 formed from a material having a different specific gravity, said head body 48 and the hosel 47 being formed in advance by forging, then integrally combined. The head body 48 has a flat abutting portion 49 which is circularin plan view at its upper part of one side thereof, to which is joined another flat abutting portion 50 of the same plan section formed at a lower part of the hosel 47. Then, the shaft 42 is inserted into a mounting hole 51 formed at the upper part of the hosel 47.

For the long irons of the 1st iron to the 5th iron in the aforesaid Table 1, beryllium copper alloy (the specific gravity:approx. 8.2) or steel (the specific gravity:approx.

7.9) is chosen as the material for the head body 48, while titanium or titanium alloy (the specific gravity:approx. 4.5) for that for the hosel 47. Thus, the specific gravity of the material for the hosel 47 is smaller than that for the head body 48.

On the other hand, for the short irons including the 6th to 9th irons, PW, SW and LW in the aforesaid Table 1, titanium ortitanium alloy (the specific gravity:approx. 4.5) or steel (the specific gravity:approx. 7.9) is chosen as the material for the head body 48, while beryllium copper alloy (the specific gravity:approx. 8.2) for that for the hosel 47. Thus, the specific gravity of the material for the hosel 47 is greater than that for the head body 48. Incidentally, reference numeral 52 designates so-called score lines formed on the face 43.

Next, the production method of the above structured golf club head will be explained.

For joint between the head body 48 and the hosel 47, both of which being formed from different material by forging, a pressing force F is applied to the head body 48 and the hosel 47 with a central axis 49A of the abutting portion 49 aligned to another central axis 50A of the other abutting portion 50, then relatively rotating the hosel 47 so as to generate frictional heat between the abutting portions 49 and 50. With the frictional heat, the head body 48 can be joined to the hosel 47 via a boundary surface 53. Then, the mounting hole 51 is formed coaxially with respect to the central axis 50A.

Next, the action of the above-structured golf club head will be explained.

For long irons, the hosel 47 is made of material thinner than that for the head body 48, whereby the center of gravity $G_1$ of the head 41 can be positioned at the other side of thereof and lowered, as compared to the conventional golf club head having a head body integrally combined with a hosel, both being made of steel. Accordingly, an orbital radius in swinging is made larger, thereby increasing a moment of inertia. Consequently, a larger impact can be given golf balls to allow them to travel a longer distance.

For short irons, the hosel 47 is made of material denser than that for the head body 48, whereby the center of gravity $G_2$ of the head 41 can be positioned at one side thereof and raised, as compared to the conventional golf club head having a head body integrally combined with a hosel, both being made of steel. Accordingly, an orbital radius in swinging is made smaller, thereby decreasing a moment of inertia. Consequently, weight proximate to a player's hand can be relatively increased so as to permit the better control of the balls in striking them.

As above described, according to a fourth embodiment of the invention, the abutting portion 49 formed at the upper part of one side of the head body 48 is allowed first to contact the other abutting portion 50 formed at the lower part of the hosel 47 then be relatively rotated while applying a pressing force thereto, whereby the frictional heat can be generated. With the use of the frictional heat thus generated, friction welding can be carried out, so that an area affected by the heat in such joining process can be made relatively smaller whilst the connection strength at the boundary portion 53 is relatively greater, in addition to a noticeably short joining time per one joining process as well as improved productivity.

Further, as the head body 48 with the face 43 and the hosel 47 are each formed from material having the different specific gravities, the centers of gravity $G_1$ and $G_2$ of the head 41 can be adjustably located, thereby changing the moment of inertia prescribed between the $G_1$, $G_2$ and a player's shoulder approximated to a rotational center in swinging, thereby permitting the exhibiting of the performances, corresponding to each iron number, such as elongating the travelling distance of balls or better controlling of them.

Figure 12:
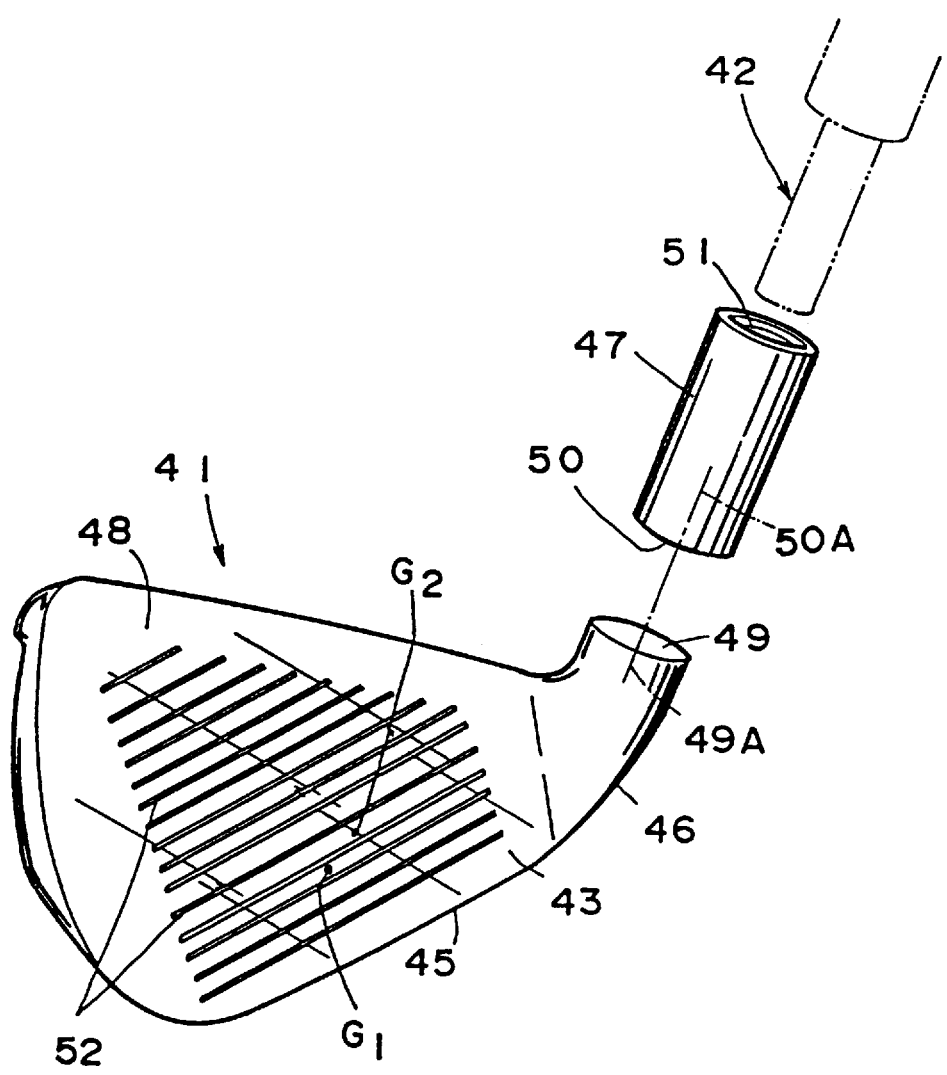
FIG. 12 is an exploded perspective view showing a fifth embodiment of the invention.
Figure 13:
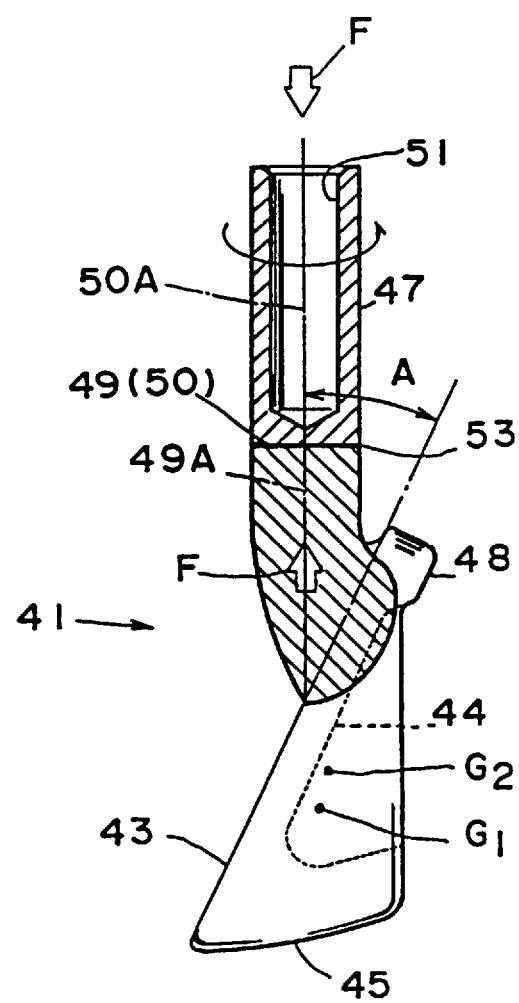
FIG. 13 is a section showing a fifth embodiment of the invention, illustrating a golf club head in a joined state.
Figure 14:
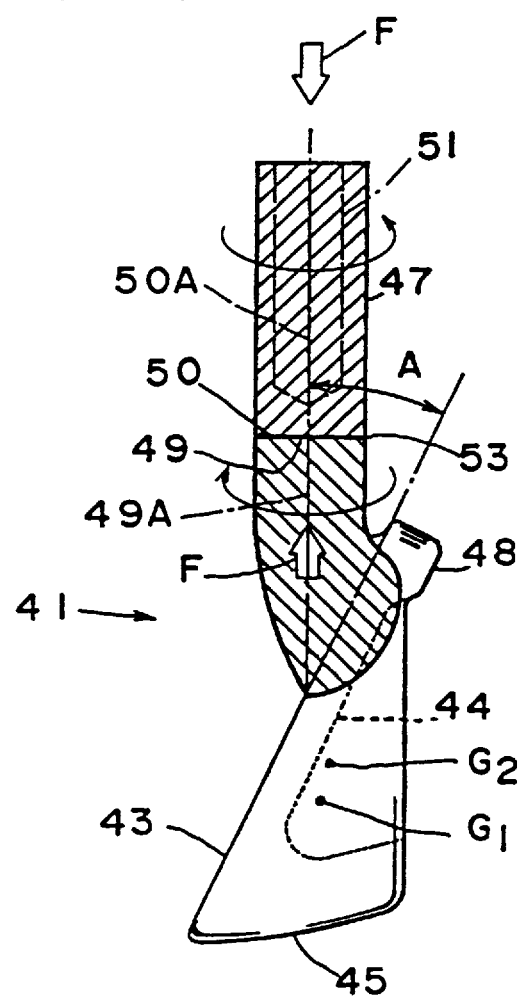
FIG. 14 is a section showing a sixth embodiment of the invention, illustrating a golf club head in a joined state.
Figure 15:
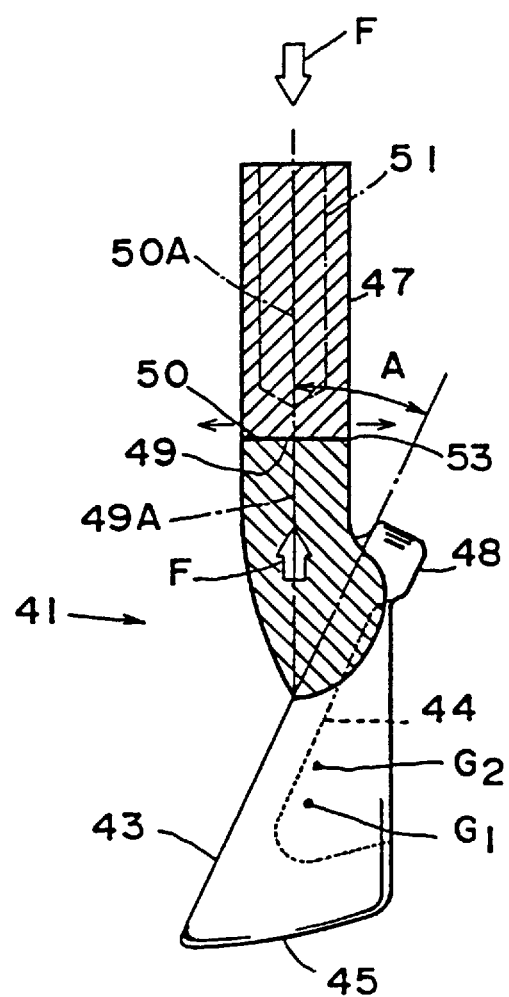
FIG. 15 is a section showing a seventh embodiment of the invention, illustrating a golf club head in a joined state.
Figure 16:
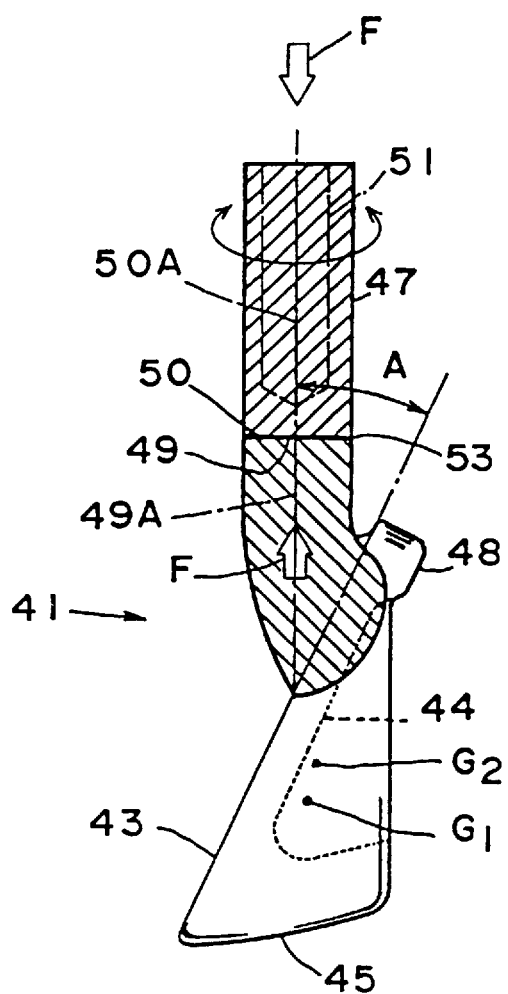
FIG. 16 is a section showing an eighth embodiment of the invention, illustrating a golf club head in a joined state.

FIGS. 12 and 13 show a fifth embodiment of the invention, while FIGS. 14 to 16 show sixth to eighth embodiments respectively, in which the same portions as described in a fourth embodiment will be designated as common reference numerals, and their repeated detailed descriptions will be omitted.

In a fifth embodiment as illustrated by FIGS. 12 and 13, the mounting hole 51 is formed in advance in the hosel 47, coaxially with respect to the central axis 50A. Then, a pressing force F is applied to the head body 48 and the hosel 47 with a central axis 49A of the abutting portion 49 aligned to the other central axis 50A of the other abutting portion 50, then relatively rotating the hosel 47 so as to generate frictional heat between the abutting portions 49 and 50. With the frictional heat, the head body 48 can be joined to the hosel 47 via the boundary surface 53.

Besides the foregoing advantages, the golf club head of a fifth embodiment is advantageous in that as the mounting hole 51 is formed in advance in the hosel 47, it can be more easily formed therein, prior to joining the hosel 47 to the head body 48.

In a sixth embodiment as illustrated by FIG. 14, a pressing force F is applied to the head body 48 and the hosel 47 with the central axis 49A of the abutting portion 49 aligned to the other central axis 50A of the other abutting portion 50, then rotating both of the hosel 47 and the head body 48 reversely with respct to each other, thus generating frictional heat between the abutting portions 49 and 50. With thus more effectively generated frictional heat, the head body 48 can be joined to the hosel 47 via the boundary surface 53.

In a seventh embodiment as illustrated by FIGS. 15, a pressing force F is applied to the head body 48 and the hosel 47 with the central axis 49A of the abutting portion 49 aligned to the other central axis 50A of the other abutting portion 50, then laterally reciprocating the hosel 47 relative to the head body 48, thus generating frictional heat between the abutting portions 49 and 50. With thus more effectively generated frictional heat, the head body 48 can be joined to the hosel 47 via the boundary surface 53.

In an eighth embodiment as illustrated by FIG. 16, a pressing force F is applied to the head body 48 and the hosel 47 in the same manner as the foregoing embodiments, then rotation-vibrating the hosel 47 relative to the head body 48, thus generating frictional heat between the abutting portions 49 and 50. With thus more effectively generated frictional heat, the head body 48 can be joined to the hosel 47 via the boundary surface 53.

Incidentally, the present invention should not be limited to the foregoing embodiments, but may be modified within a technical scope of the invention. For example, the difference in weight or the weight ratio between the head body and the hosel may be chosen in a manner like arithmetical progression or geometrical progression. Further, the aforesaid Table 1 only indicates the most standard values, and other values can be suitably chosen. In addition, in carrying out the friction welding, the head body can be rotated instead of rotating the hosel as described in a fourth embodiment.

What is claimed:

1. A production method for an iron-type golf club head having a head body defining a face at its front and a hosel provided at its one side for mounting a shaft thereto, which comprises the steps of:

forming said head body and said hosel from different material having the different specific gravities respectively;

allowing one side of said head body to abut to said hosel, then joining said head body to said hosel by means of a friction welding.

2. A production method for an iron-type golf club head according to claim 1, wherein for short irons, said hosel is formed from a material denser than that of said head body, while for long irons, said head body is formed from a material denser than that of said hosel.

3. A production method for an iron-type golf club head according to claim 2, wherein said step of the friction welding comprises the steps of:

forming one abutting portion at an upper part of said head body, while forming another abutting portion at a lower end of said hosel;

allowing the two abutting portions to contact each other, then applying a pressing force thereto while rotating one of the abutting portions relative to the other.

4. A production method for an iron-type golf club head according to claim 2, wherein said step of the friction welding comprises the steps of:

forming one abutting portion at an upper part of said head body, while forming another abutting portion at a lower end of said hosel;

allowing the two abutting portions to contact each other, then applying a pressing force thereto while rotating the two abutting portions reversely with respect to each other.

5. A production method for an iron-type golf club head according to claim 2, wherein said step of the friction welding comprises the steps of:

forming one abutting portion at an upper part of said head body, while forming another abutting portion at a lower end of said hosel;

allowing the two abutting portions to contact each other, then applying a pressing force thereto while reciprocating one of the abutting portions laterally relative to the other.

6. A production method for an iron-type golf club head according to claim 2, wherein said step of the friction welding comprises the steps of:

forming one abutting portion at an upper part of said head body, while forming another abutting portion at a lower end said hosel;

allowing the two abutting portions to contact each other, then applying a pressing force thereto while vibration-rotating one of the abutting portions relative to the other.

* * * * *